US012567316B1

(12) United States Patent
Jacobs et al.

(10) Patent No.: US 12,567,316 B1
(45) Date of Patent: Mar. 3, 2026

(54) SECURITY SYSTEMS AND METHODS FOR DETECTING ANOMALOUS EVENTS USING SENSORS

(71) Applicant: State Farm Mutual Automobile Insurance Company, Bloomington, IL (US)

(72) Inventors: Jenny L. Jacobs, Normal, IL (US); Robyn Pemberton, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 122 days.

(21) Appl. No.: 18/486,882

(22) Filed: Oct. 13, 2023

Related U.S. Application Data

(60) Provisional application No. 63/517,276, filed on Aug. 2, 2023.

(51) Int. Cl.
*G08B 13/00* (2006.01)
*G06N 20/00* (2019.01)
(Continued)

(52) U.S. Cl.
CPC ............. *G08B 13/00* (2013.01); *G06N 20/00* (2019.01); *G08B 21/12* (2013.01); *G08B 31/00* (2013.01)

(58) Field of Classification Search
CPC ........ G08B 13/00; G08B 21/12; G08B 31/00; G06N 20/00
(Continued)

(56) References Cited

U.S. PATENT DOCUMENTS 6,353,385 B1 * 3/2002 Molini ................... G08B 25/00
340/541
8,433,344 B1 4/2013 Virga
(Continued)

FOREIGN PATENT DOCUMENTS

AU 2015100551 A4 5/2015
WO 2018052595 A1 3/2018

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.
(Continued)

*Primary Examiner* — Brian A Zimmerman
*Assistant Examiner* — Thang D Tran
(74) *Attorney, Agent, or Firm* — Armstrong Teasdale LLP

(57) ABSTRACT

A computer system for maintaining the security of a building is provided. The computer system includes a processor and a memory. The processor is configured to: (i) receive data from a plurality of sensors; (ii) apply the data to a trained security assessment model to generate at least one model output, the trained security assessment model configured to compare the data from the plurality of sensors to a plurality of danger profiles; (iii) determine an anomalous event is occurring and a security response to the anomalous event based on the at least one model output, the security response including a plurality of tasks; (iv) trigger a first task of the plurality of tasks; and/or (v) in response to determining a predetermined period of time has elapsed, trigger a second task of the plurality of tasks.

20 Claims, 7 Drawing Sheets

(51) Int. Cl.
　　*G08B 21/12*　　　(2006.01)
　　*G08B 31/00*　　　(2006.01)

(58) Field of Classification Search
　　USPC ......................................................... 340/541
　　See application file for complete search history.

(56) References Cited

U.S. PATENT DOCUMENTS

| | | | |
|---|---|---|---|
| 8,712,805 | B1 | 4/2014 | Ferries et al. |
| 9,269,250 | B2 | 2/2016 | Nickles |
| 10,055,793 | B1 | 8/2018 | Call et al. |
| 10,062,118 | B1 | 8/2018 | Bernstein et al. |
| 10,229,394 | B1 | 3/2019 | Davis et al. |
| 10,621,839 | B2* | 4/2020 | Vazirani ............... G08B 29/188 |
| 10,623,509 | B2 | 4/2020 | Delinselle et al. |
| 10,672,081 | B1 | 6/2020 | Lyons et al. |
| 10,699,346 | B1* | 6/2020 | Corder ................... G06Q 40/08 |
| 10,810,845 | B2 | 10/2020 | Coles |
| 10,861,115 | B1 | 12/2020 | Stricker et al. |
| 11,003,334 | B1 | 5/2021 | Conway et al. |
| 11,037,255 | B1 | 6/2021 | Ganev et al. |
| 11,055,797 | B1* | 7/2021 | Carone ................. G06Q 50/163 |
| 11,087,347 | B1 | 8/2021 | De Guia et al. |
| 11,087,420 | B1 | 8/2021 | Trundle |
| 11,210,741 | B1 | 12/2021 | Allen et al. |
| 11,331,523 | B2* | 5/2022 | Schmitt ................ G05B 19/406 |
| 11,501,100 | B1 | 11/2022 | Geng et al. |
| 11,656,097 | B2 | 5/2023 | Vega et al. |
| 11,735,017 | B2 | 8/2023 | Albero |
| 11,748,817 | B2 | 9/2023 | Szott |
| 2007/0019788 | A1* | 1/2007 | Ledoux .................. G01N 23/20 |
| | | | 378/88 |
| 2008/0255862 | A1 | 10/2008 | Bailey et al. |
| 2011/0066081 | A1* | 3/2011 | Goto ..................... A61B 5/1118 |
| | | | 600/595 |
| 2011/0270773 | A1 | 11/2011 | Siekman et al. |
| 2011/0279263 | A1* | 11/2011 | Rodkey ............... G08B 25/016 |
| | | | 340/539.13 |
| 2011/0295624 | A1 | 12/2011 | Chapin et al. |
| 2012/0072239 | A1 | 3/2012 | Gibbard et al. |
| 2012/0176237 | A1* | 7/2012 | Tabe .................... A61B 5/6804 |
| | | | 340/539.12 |
| 2013/0080129 | A1* | 3/2013 | Smith .................... G06N 20/00 |
| | | | 703/6 |
| 2015/0061859 | A1 | 3/2015 | Matsuoka et al. |
| 2015/0379834 | A1* | 12/2015 | Datta ................... G08B 25/009 |
| | | | 340/384.7 |
| 2016/0048934 | A1 | 2/2016 | Gross |
| 2016/0055594 | A1 | 2/2016 | Emison et al. |
| 2016/0196736 | A1* | 7/2016 | Nolan .................. G08B 15/004 |
| | | | 340/6.1 |
| 2016/0260059 | A1* | 9/2016 | Benjamin .......... G06Q 10/0833 |
| 2016/0275633 | A1 | 9/2016 | Gitt et al. |
| 2016/0321587 | A1 | 11/2016 | Gitt et al. |
| 2017/0178175 | A1* | 6/2017 | Dhaliwal ................ H04W 4/80 |
| 2017/0192839 | A1* | 7/2017 | Kurian .................... G06F 11/30 |
| 2018/0033087 | A1 | 2/2018 | Delinselle et al. |
| 2018/0096569 | A1* | 4/2018 | Eaton ................. G08B 21/0453 |

| | | | |
|---|---|---|---|
| 2018/0182214 | A1* | 6/2018 | Qi .......................... H04W 12/06 |
| 2019/0234973 | A1* | 8/2019 | Khomami Abadi ... G06N 3/045 |
| 2019/0251520 | A1 | 8/2019 | Bentley, III et al. |
| 2019/0302712 | A1* | 10/2019 | Neti ................... G05B 23/0254 |
| 2019/0385435 | A1* | 12/2019 | Farrand .................. G08B 25/10 |
| 2020/0226892 | A1* | 7/2020 | Coles ....................... G08B 5/38 |
| 2020/0349370 | A1* | 11/2020 | Lambert ............... G06V 20/20 |
| 2021/0011448 | A1* | 1/2021 | Coleman ........... G06Q 30/0283 |
| 2021/0018335 | A1 | 1/2021 | Hood |
| 2021/0019847 | A1 | 1/2021 | Sneed |
| 2021/0084436 | A1* | 3/2021 | Sutherland .......... H04L 63/0853 |
| 2021/0150651 | A1* | 5/2021 | Shoup ..................... G06F 17/18 |
| 2021/0173969 | A1* | 6/2021 | Abbey .................... G06F 30/13 |
| 2021/0182986 | A1 | 6/2021 | Butler et al. |
| 2021/0217295 | A1* | 7/2021 | Tan ...................... G08B 25/008 |
| 2021/0279791 | A1 | 9/2021 | Jacoby |
| 2021/0293969 | A1* | 9/2021 | Venkata Jagannadha Rao .......... |
| | | | G08B 25/016 |
| 2021/0350471 | A1 | 11/2021 | Hakimi-Boushehri et al. |
| 2022/0076158 | A1* | 3/2022 | Jayaram ............... G06Q 10/087 |
| 2022/0139201 | A1* | 5/2022 | Sjölund ................. G08B 25/14 |
| | | | 340/540 |
| 2022/0230520 | A1* | 7/2022 | Osorio ................... G08B 15/00 |
| 2022/0343443 | A1* | 10/2022 | Graham ................ G06Q 50/06 |
| 2022/0391794 | A1* | 12/2022 | Singh ................. G06Q 10/0635 |
| 2023/0035517 | A1 | 2/2023 | Alfred et al. |
| 2023/0068724 | A1* | 3/2023 | Biston ................... G08B 25/10 |
| 2023/0119146 | A1* | 4/2023 | Donegan ................. G10L 15/22 |
| | | | 340/540 |
| 2023/0169223 | A1* | 6/2023 | Ramanasankaran ... G05B 17/02 |
| | | | 703/1 |
| 2023/0230465 | A1* | 7/2023 | Julien .............. G08B 13/19608 |
| | | | 382/103 |
| 2023/0284022 | A1* | 9/2023 | Tang ..................... H04W 12/08 |
| | | | 726/12 |
| 2023/0377435 | A1* | 11/2023 | Cho ........................ G08B 17/00 |
| 2024/0021065 | A1* | 1/2024 | Nayak ............... G08B 21/0453 |
| 2024/0171594 | A1* | 5/2024 | Garcia ............... H04L 63/1425 |
| 2024/0210330 | A1* | 6/2024 | Sun ........................... G06T 7/00 |

OTHER PUBLICATIONS

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

Envirosuite, retrieved from: <https://envirosuite.com/platforms/iot/e-nose-ambient> on Oct. 11, 2023, 5 p.

Electronic nose, retrieved from https://en.wikipedia.org/wiki/Electronic_nose on Oct. 13, 2023, 10 pages.

* cited by examiner

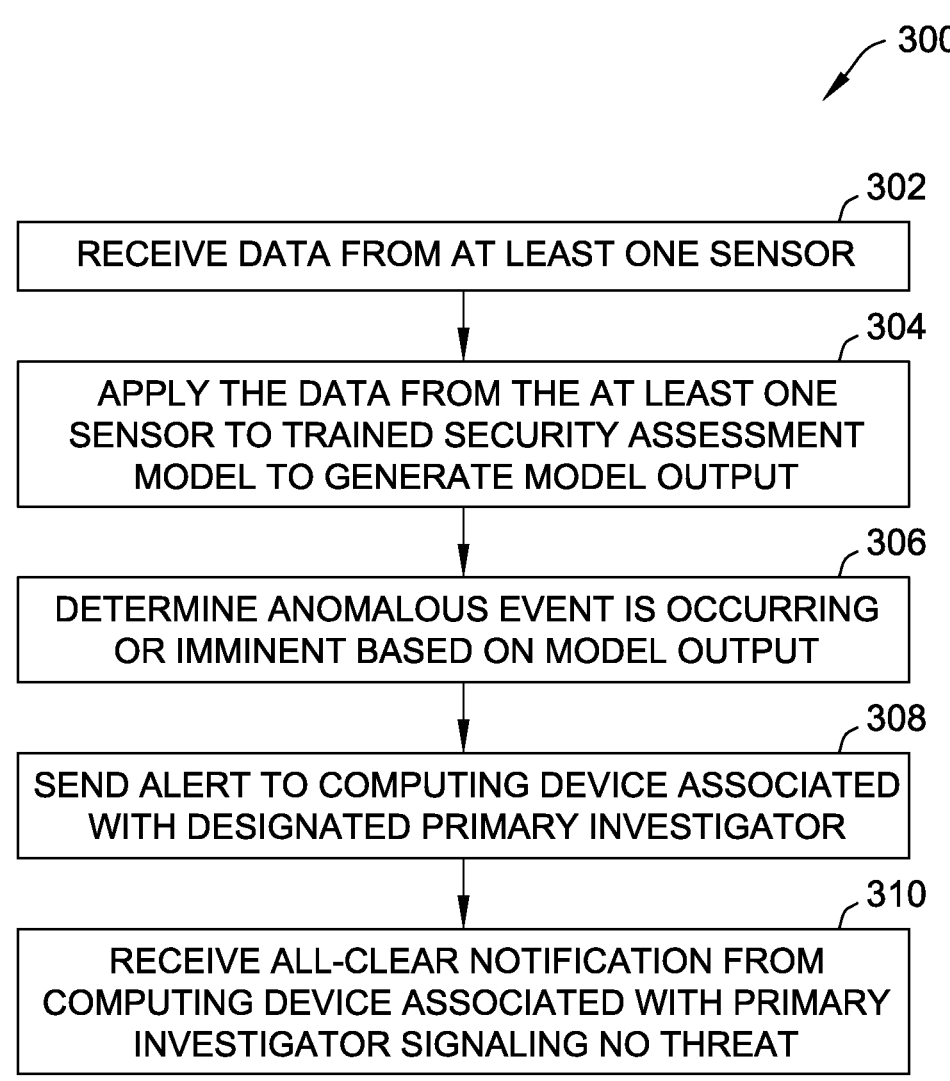

300

302

RECEIVE DATA FROM AT LEAST ONE SENSOR

304

APPLY THE DATA FROM THE AT LEAST ONE
SENSOR TO TRAINED SECURITY ASSESSMENT
MODEL TO GENERATE MODEL OUTPUT

306

DETERMINE ANOMALOUS EVENT IS OCCURRING
OR IMMINENT BASED ON MODEL OUTPUT

308

SEND ALERT TO COMPUTING DEVICE ASSOCIATED
WITH DESIGNATED PRIMARY INVESTIGATOR

310

RECEIVE ALL-CLEAR NOTIFICATION FROM
COMPUTING DEVICE ASSOCIATED WITH PRIMARY
INVESTIGATOR SIGNALING NO THREAT

FIG. 3

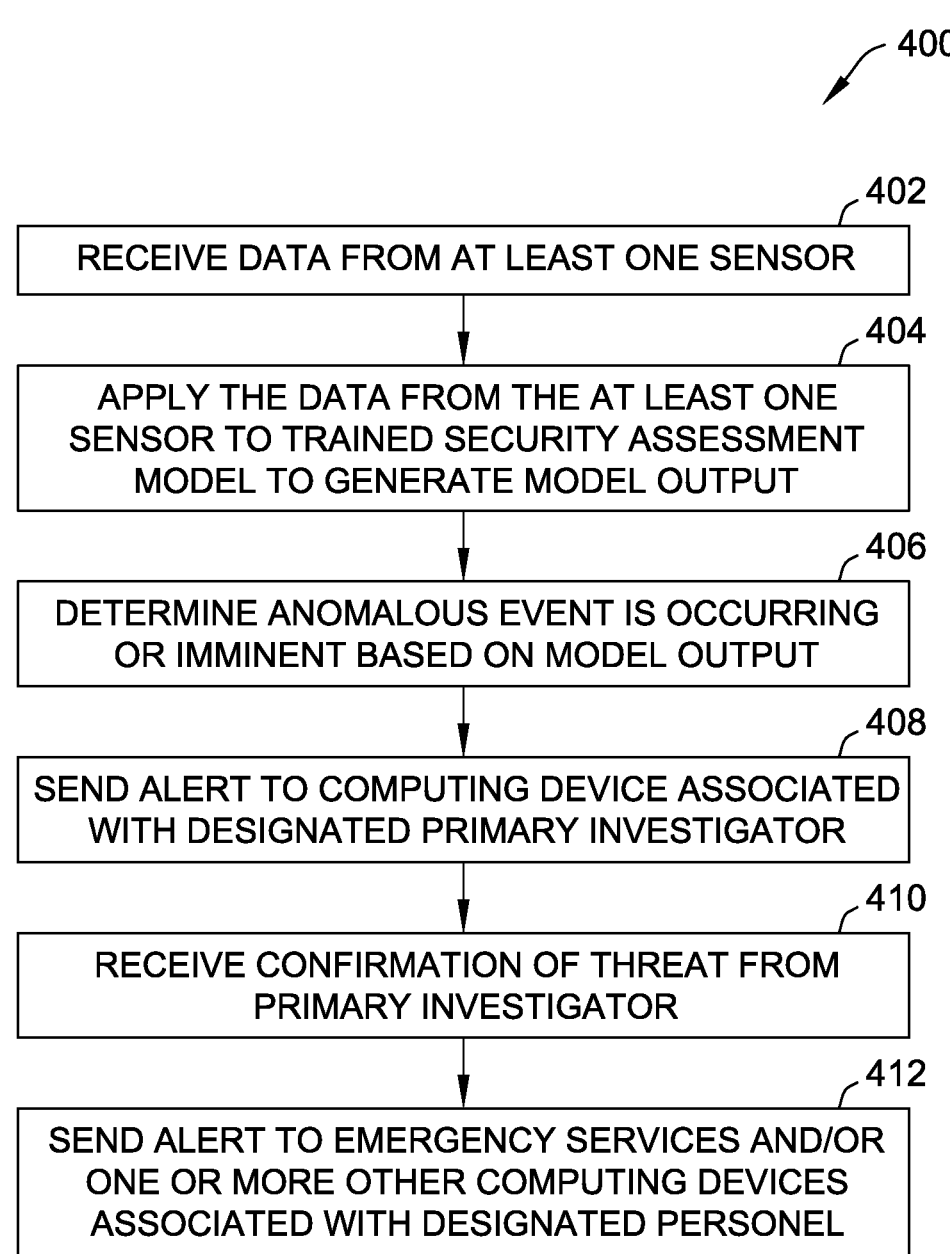

400

402
RECEIVE DATA FROM AT LEAST ONE SENSOR

404
APPLY THE DATA FROM THE AT LEAST ONE
SENSOR TO TRAINED SECURITY ASSESSMENT
MODEL TO GENERATE MODEL OUTPUT

406
DETERMINE ANOMALOUS EVENT IS OCCURRING
OR IMMINENT BASED ON MODEL OUTPUT

408
SEND ALERT TO COMPUTING DEVICE ASSOCIATED
WITH DESIGNATED PRIMARY INVESTIGATOR

410
RECEIVE CONFIRMATION OF THREAT FROM
PRIMARY INVESTIGATOR

412
SEND ALERT TO EMERGENCY SERVICES AND/OR
ONE OR MORE OTHER COMPUTING DEVICES
ASSOCIATED WITH DESIGNATED PERSONEL

FIG. 4

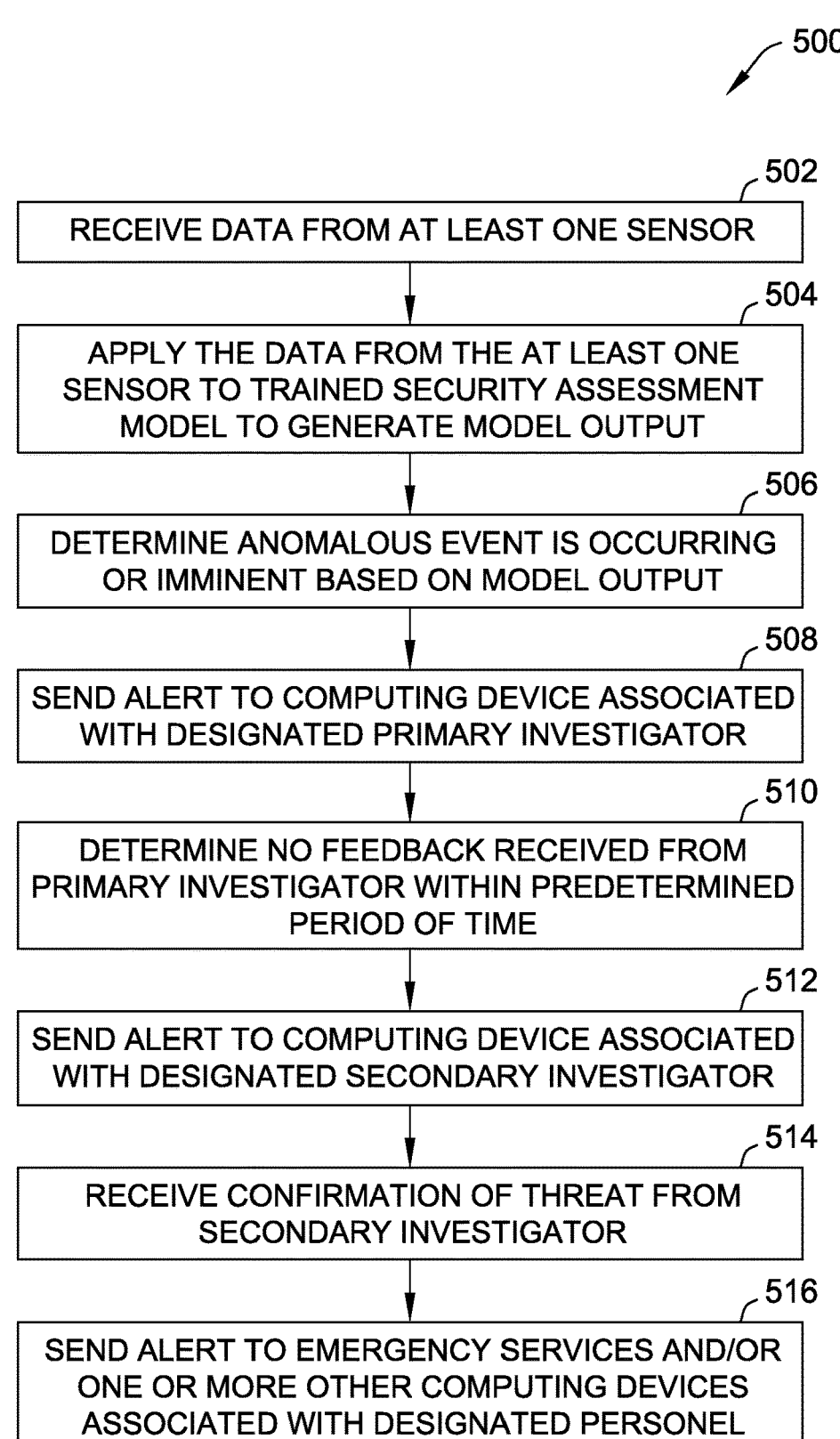

500

502

RECEIVE DATA FROM AT LEAST ONE SENSOR

504

APPLY THE DATA FROM THE AT LEAST ONE SENSOR TO TRAINED SECURITY ASSESSMENT MODEL TO GENERATE MODEL OUTPUT

506

DETERMINE ANOMALOUS EVENT IS OCCURRING OR IMMINENT BASED ON MODEL OUTPUT

508

SEND ALERT TO COMPUTING DEVICE ASSOCIATED WITH DESIGNATED PRIMARY INVESTIGATOR

510

DETERMINE NO FEEDBACK RECEIVED FROM PRIMARY INVESTIGATOR WITHIN PREDETERMINED PERIOD OF TIME

512

SEND ALERT TO COMPUTING DEVICE ASSOCIATED WITH DESIGNATED SECONDARY INVESTIGATOR

514

RECEIVE CONFIRMATION OF THREAT FROM SECONDARY INVESTIGATOR

516

SEND ALERT TO EMERGENCY SERVICES AND/OR ONE OR MORE OTHER COMPUTING DEVICES ASSOCIATED WITH DESIGNATED PERSONEL

FIG. 5

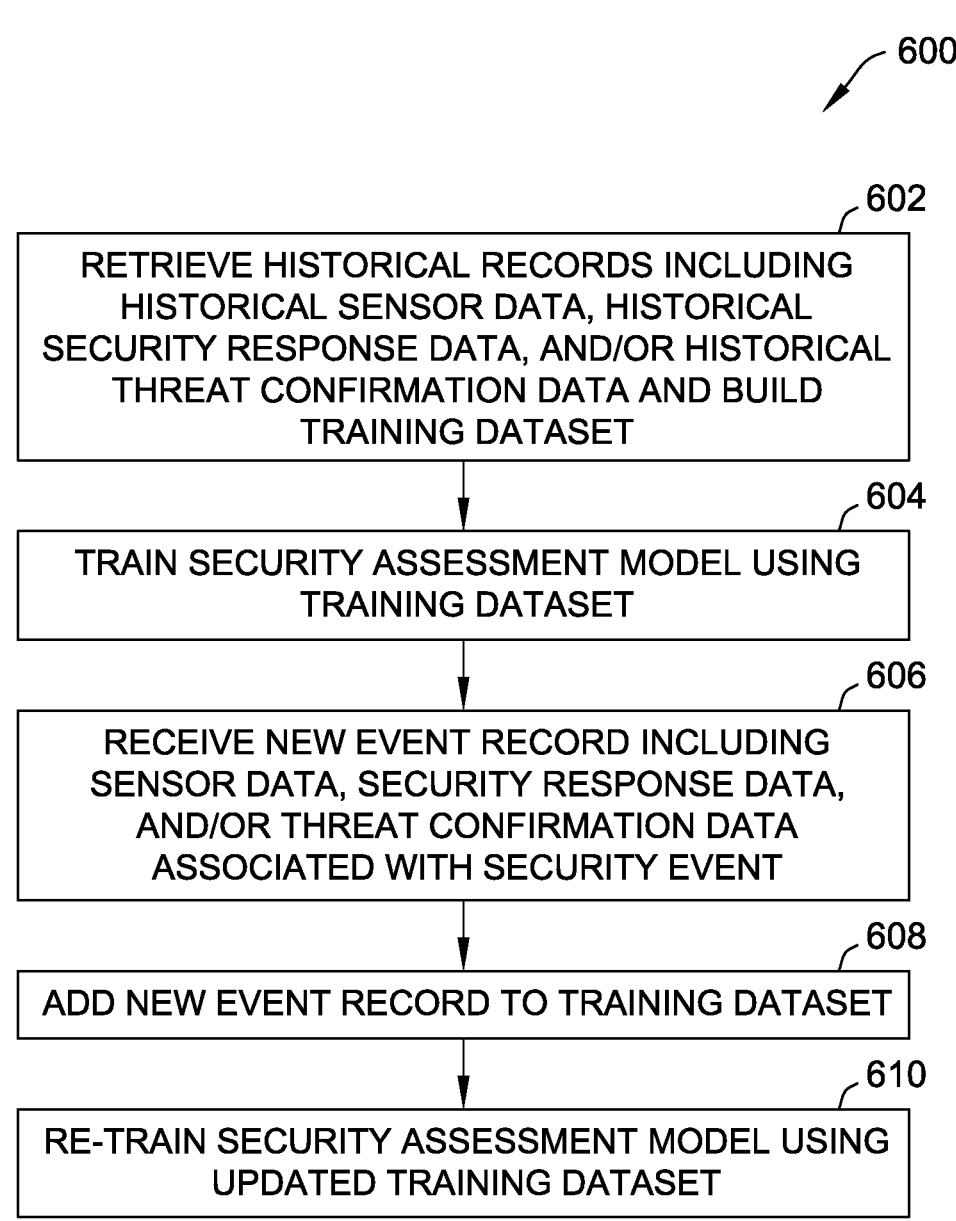

600

602

RETRIEVE HISTORICAL RECORDS INCLUDING HISTORICAL SENSOR DATA, HISTORICAL SECURITY RESPONSE DATA, AND/OR HISTORICAL THREAT CONFIRMATION DATA AND BUILD TRAINING DATASET

604

TRAIN SECURITY ASSESSMENT MODEL USING TRAINING DATASET

606

RECEIVE NEW EVENT RECORD INCLUDING SENSOR DATA, SECURITY RESPONSE DATA, AND/OR THREAT CONFIRMATION DATA ASSOCIATED WITH SECURITY EVENT

608

ADD NEW EVENT RECORD TO TRAINING DATASET

610

RE-TRAIN SECURITY ASSESSMENT MODEL USING UPDATED TRAINING DATASET

FIG. 6

SECURITY SYSTEMS AND METHODS FOR DETECTING ANOMALOUS EVENTS USING SENSORS

CROSS-REFERENCE TO RELATED APPLICATIONS

The present application claims priority to U.S. Provisional Application No. 63/517,276, filed Aug. 2, 2023, entitled "SECURITY SYSTEMS AND METHODS FOR DETECTING ANOMALOUS EVENTS USING SENSORS," the entire contents of which are hereby incorporated herein by reference in their entirety.

FIELD OF THE DISCLOSURE

The field of the disclosure relates generally to detecting anomalous events using sensors, and more specifically, to network-based security systems that utilize sensors and/or artificial intelligence to detect anomalous events and/or security risks at buildings, such as schools or office buildings.

BACKGROUND

Security systems and procedures that detect security risks at entry points of buildings are becoming more and more prevalent in today's society. These security systems may be used at office buildings and/or schools prior to people being allowed in, and may include devices, such as metal detectors and cameras, and/or procedures, such as identification checks. Another example of a security system that may be used at an office building or a school may include automatic locks at doors with sensors or cameras for detecting unauthorized entry into the building. Another example may include a fire detection and suppression system that includes sensors for detecting smoke or a fire within a building, and a sprinkler system that may be automatically triggered to put out the fire.

These are all types of security systems that may be used within a home, a school, or other building to respond to certain conditions or anomalous events, and provide an additional layer of security to those that enter and spend time within the building. In other words, these building security systems and procedures used within schools and other buildings generally increase the health and safety of the structures in which they are installed, as well as, in the case of schools, provide parents and children with a greater sense of security.

In recent years, the number of tragic events that have occurred within schools involving an intruder with a weapon gaining entry into the school have increased significantly. These tragic events often occur despite certain building security measures being used at the schools and have resulted in tremendous harm to the lives of children, teachers, parents, building personnel, and the communities surrounding these schools.

Accordingly, a network-based security system capable of determining when an anomalous event and/or security risk is about to occur in order to allow for time and/or resources to address the event or security risk before harm is caused is desirable. Conventional techniques may include additional inefficiencies, encumbrances, ineffectiveness, and/or other drawbacks as well.

BRIEF DESCRIPTION

The present embodiments may relate to, inter alia, systems and methods that retrieve and aggregate, from a plurality of sensors, data relating to an environment of a building and/or school (sometimes referred to herein as "sensor data") and information on whether an anomalous event is occurring. The system may query an AI model (e.g., a large language trained generative an AI model) to initiate, for example, a security response upon detection of an anomalous event (e.g., a potential security issue). The use of the AI model may be available in various mediums such as a computer and/or mobile application, chat screens, web page, voice interaction with a voice chat-capable connected home device, voice bot or chat bot, and/or social media messaging. Accordingly, the security responses and/or determinations of anomalous events may be generated in response to natural language queries submitted by designated persons associated with the safety of the building. The systems and methods described herein may include additional, less, or alternate functionality, including that discussed elsewhere herein.

In one aspect, a computer system for generating a security response and/or determining that an anomalous event is about to occur or occurring may be provided. The system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another.

For example, in one exemplary embodiment, the computer system may include at least one memory and at least one processor programmed to: (i) receive data from a plurality of sensors located near or within the building; (ii) apply the data from the plurality of sensors to a trained security assessment model to generate at least one model output, the trained security assessment model configured to compare the data from the plurality of sensors to a plurality of danger profiles; (iii) determine an anomalous event is occurring and a security response to the anomalous event based on the at least one model output, the security response including a plurality of tasks; (iv) trigger a first task of the plurality of tasks; and/or (v) in response to determining a predetermined period of time has elapsed, trigger a second task of the plurality of tasks. The computer system may include additional, less, or alternate functionality, including that discussed elsewhere herein.

In yet another aspect, a computer-implemented method for generating a security response and/or determining that an anomalous event is about to occur may be provided. The computer-implemented method may be performed by a computing device including at least one processor and at least one memory device. The method may include, via the at least one processor: (i) receiving data from a plurality of sensors located near or within the building; (ii) applying the data from the plurality of sensors to a trained security assessment model to generate at least one model output, the trained security assessment model configured to compare the data from the plurality of sensors to a plurality of danger profiles; (iii) determining an anomalous event is occurring and a security response to the anomalous event based on the at least one model output, the security response including a plurality of tasks; (iv) triggering a first task of the plurality of tasks; and/or (v) in response to determining a predetermined period of time has elapsed, triggering a second task of the plurality of tasks. The method may have additional, less, or alternate actions, including that discussed elsewhere herein.

In still another aspect, at least one non-transitory computer readable medium with computer-executable instructions embodied thereon is provided. When executed by at least one processor, the computer-executable instructions cause the at least one processor to: (i) receive data from a plurality of sensors located near or within a building; (ii) apply the data from the plurality of sensors to a trained security assessment model to generate at least one model output, the trained security assessment model configured to compare the data from the plurality of sensors to a plurality of danger profiles; (iii) determine an anomalous event is occurring and a security response to the anomalous event based on the at least one model output, the security response including a plurality of tasks; (iv) trigger a first task of the plurality of tasks; and/or (v) in response to determining a predetermined period of time has elapsed, trigger a second task of the plurality of tasks. The computer readable medium may have instructions that direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIG. 3 depicts a flow diagram of an exemplary method for detecting an anomalous event and generating a security response in response to the anomalous event, in accordance with an embodiment of the present disclosure;

FIG. 4 depicts another flow diagram of an exemplary method for detecting an anomalous event and generating a security response in response to the anomalous event, in accordance with an embodiment of the present disclosure;

FIG. 5 depicts another flow diagram of an exemplary method for detecting an anomalous event and generating a security response in response to the anomalous event, in accordance with an embodiment of the present disclosure;

FIG. 6 depicts a flow diagram of an exemplary method for training and re-training a security assessment model, in accordance with an embodiment of the present disclosure.

Figure 1:
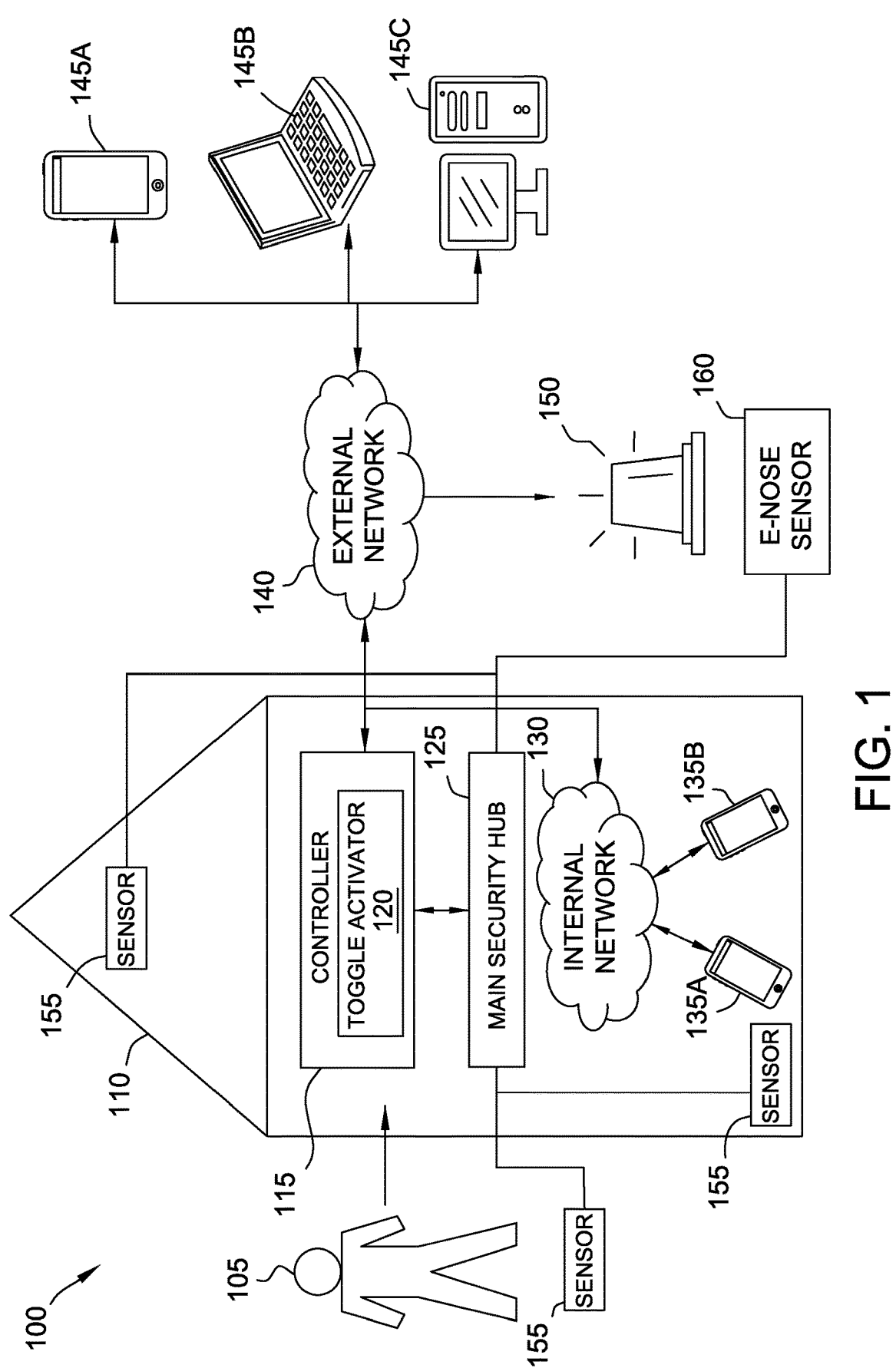
FIG. 1 illustrates an exemplary security system for generating AI-based responses to detected anomalous events, in accordance with an embodiment of the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, security systems and methods that determine that an anomalous event is about to occur within or near a building and/or generate a security response thereto using artificial intelligence (AI) techniques. The present embodiments may relate to systems and methods that collect data, from a plurality of sensors, relating to the environment of a building and/or school (sometimes referred to herein as "sensor data") and information on whether an anomalous event (e.g., an intruder is attempting to enter a building with a weapon of some type, etc.) is impending or occurring. The system may query an AI model (e.g., a large language trained generative an AI model) to initiate, for example, a security response upon detection of an impending anomalous event. The system may generate a sequence of tasks for responding to the anomalous event, and the timing of the sequence of tasks may be tracked to ensure a swift and/or adequate security response in view of the level of threat predicted. The use of the AI model may be available in various mediums such as a computer and/or mobile application, chat screens, web page, voice interaction with a voice chat-capable connected home device, voice bot or chat bot, and/or social media messaging. The systems and methods described herein may include additional, less, or alternate functionality, including that discussed elsewhere herein.

In the embodiments described herein, sensors may include, for example, any combination of temperature sensors, WiFi sensors, air quality sensors (e.g., including E-Nose sensors, which are discussed in greater detail herein), motion sensors, heat sensors, etc. The system may query the AI model to determine, for example, whether the aggregate sensor data at any given point in time matches against any of a plurality of danger profiles indicating that an anomalous event is about to occur. The use of the AI model may be available in various mediums such as a computer and/or mobile application, chat screens, web page, voice interaction with a voice chat-capable connected home device, voice bots or chat bots, ChatGPT bots, and/or social media messaging.

In some embodiments, the system may receive additional input from a building administrator and/or other designated individual (e.g., school principal or assistant principal), the input including a list of individuals entering and/or exiting the school, in order to determine, in combination with the array of sensors, whether an unauthorized individual is present in or near the building. The received sensor data may be categorized based on the type of data and prioritized accordingly for analysis by the system. For example, if input from the building administrator and/or various badge scanning sensors indicate an unauthorized individual, however, the other sensors in the sensor suite do not indicate anything out of the ordinary, the system may, using the AI model, trigger a security alert to ensure the safety of the school is not compromised. In other words, the system would be intelligent enough to deploy a response that is in line with the threat level of the safety of the school.

In certain embodiments disclosed herein, tasks of the security response initiated by the system, based on the analysis performed by the AI model, may vary depending on the severity of the anomalous event detected. For example, if the sensor data indicates that an unauthorized individual entered the building, but no weapon was detected, the sequence of tasks initiated by the system in response to detection of that anomalous event may be less severe than that of an anomalous event wherein a firearm has been detected. In certain embodiments disclosed herein, an example of a less severe security response may be one in which the system triggers an alert to just the principal of the school (e.g., the first designated individual) to investigate the situation. In more severe situations, such as those in which a firearm has been detected, in examples disclosed herein, the system may trigger a sequence of tasks wherein both the principal and vice principal are alerted at once, along with first responders after a certain amount of time. In some embodiments, tasks are customizable on a by-building basis (e.g., by an entity associated with a building being monitored).

In some embodiments disclosed herein, the timing of sequence of tasks initiated as part of the security response in response to detection of an anomalous event by the AI model is tracked in order to ensure the security response runs smoothly. That is, in examples disclosed herein, if the AI model determines that the threat is severe, and the first alert has not been addressed by the first designated individual, after a certain period of time (e.g., 30 seconds), the system may send a second alert to a second designated individual automatically. If, for example, that second designated individual does not respond to the second alert, the system may then trigger an alert to emergency services. In certain examples disclosed herein, the AI model will determine a sequence of tasks (e.g., locking the doors, turning off the lights, sending a series of alerts, etc.) based on the nature of the anomalous event that has been detected. In some embodiments, timings are customizable on a by-building basis (e.g., by an entity associated with a building being monitored).

In some embodiments, the AI model may build danger profiles based on external data provided to the AI model via a database. For example, the danger profiles may indicate certain threshold markers of sensor data for each type of sensor in the associated sensor suite and/or sensor hub for the building that would indicate anomalous event(s). That is, if the AI model were to detect a range of sensor data falling within a "danger range," as indicated by the danger profiles, a security alert would be triggered by the system.

In some embodiments, the system may be programmed to use the AI model to trigger a security response, such as an alert being sent to an indicated number and/or type of individuals who are authorized to deal with the security breach. The AI model may use geolocation to determine proximity of that authorized individual to the school, and based on their geolocation, send a second set of alerts to a plurality of individuals who are nearby and can assist with securing the school.

Further, in some embodiments, the system may be programmed such that if one or more of the authorized individuals to whom the security alert was sent do not respond within a threshold amount of time (e.g., 5 minutes), a second set of alerts may be generated to another set of individuals.

In some embodiments, the system may be communicatively coupled to a communication network, such as an internal network and/or an external network. The system may receive and transmit alerts through these internal and/or external networks in response to a determination that an anomalous event is about to occur.

In the exemplary embodiment, the system may build an AI model that stores danger profiles and compares received sensor data against these stored danger profiles to determine a match or a similarity. In some embodiments, the AI model may additionally receive third party data relating to police scanner activity, etc. that would indicate that an unauthorized individual and/or intruder was headed towards the building. This received data may be used to train the AI model, to output security responses, and to generate security alerts to personal devices, as described in further detail below. The outputs and resulting events may then be used to re-train the AI model to that the AI model grows and improves it accuracy on a continuous basis.

In the exemplary embodiment, the system may build the model to generate alerts to any combination of other individuals (e.g., police departments, first responders, etc.) in addition to the authorized individuals within the school in a combined security effort. The alerts may further be generated and transmitted to personal device(s) of parents and/or or guardians whose children attend the school. The output generated by the AI model may further include information about the intruder (e.g., height, weight, image), a direction in which the intruder is traveling, a type of weapon the intruder is carrying, etc. to further assist the security response team in securing the school after occurrence of an anomalous event has been determined.

The system may further collect school environment data from third party and/or external sources (e.g., publicly available data, such as historical weather-related information or power outage statistics for the area, emergency service response statistics for the area, police information, Amber alerts, or the like) in addition to the sensor data collected within the building, which the AI model may use to compare the data against danger profiles to determine whether an anomalous event is set to occur. The responsible person(s)/user may also provide the system with access to data from different buildings near the vicinity of the school in order to initiate a more expansive and preventative security response based on that data. These devices may provide their data directly and/or provide data through servers or internal and/or external networks associated with the school security system.

In the exemplary embodiment, the AI model may generate a security response based on the retrieved data relating to the connected sensors currently installed within the building and, in at least some instances, third party data relating to other buildings within a geographic vicinity of the building. The security response may include specific directions indicating, for example, an armed/unarmed nature of the intruder, a threat level, a direction of travel of the intruder, etc. The system may further provide additional information relating to the intruder situation and/or the anomalous events to parents of the children at the school. In some embodiments, particular information may be generated in response to a query by the parents and/or may be periodically generated automatically (e.g., as a developing report to the parents based on new information received by the system, school personnel, and/or first responders).

In the exemplary embodiment, the AI model may output alerts in a data interchange format such as JavaScript Object Notation (JSON), which may be interpreted by other components of the system to display the recommendation on a personal device (e.g., a monitor in the school, a cell phone of a designated individual, etc.). For example, in embodiments in which the recommendation is displayed via a mobile application, the mobile application may be configured to generate a user interface (e.g., including text, lists, shapes, colors, sounds, etc.) for presenting the recommendations based on recommendation data output by the AI model.

In the exemplary embodiment, the triggered alerts may be presented to at least the designated individuals, parents, and/or first responders. In some embodiments, the alerts may be presented as a push notification on a user's personal device, which may include text and/or images. In some embodiments, the alerts may include an option to neutralize or over-ride the triggered security response in situations wherein a false alarm occurs. That is, in some embodiments, an option may exist to mark the situation as "safe," indicating that no anomalous event has actually occurred or that the anomalous event has been addressed. In these embodiments, a separate password and/or authorization may be required to be able to neutralize the security response. Also in these exemplary embodiments, the AI model would then be retrained to modify the danger profile against which the received sensor data was compared to trigger the security alert in order to recalibrate the threshold values indicating an anomalous event. In the example embodiment, feedback, such as that indicating false alarms, may be used to continually update the AI model.

In some embodiments, the system may also build a digital twin model to mirror the location and detection range of the plurality of sensors within the school building. In some embodiments, the system may include a risk evaluation engine that may evaluate the digital twin and evaluate various risks associated with the sensor setup (e.g., such as identifying blindspots, etc.). The digital twin may be a 3-D representation of the building that may be viewed at any angle and may be interacted with in a virtual environment, such as through a personal computing device, a smartphone, an augmented reality (AR) and/or virtual reality (VR) device, etc. In some embodiments disclosed herein, the digital twin may provide information to the first designated individual, the second designated individual, emergency responders, etc. as to the location of the intruder, paths of access to apprehend the intruder, locations where bystanders may be present, etc. in order to better aid the security response.

In some embodiments, the digital twin may be tied to VR goggles to allow for real-time location and/or sensor information to be relayed to individuals aiding in the security effort during an anomalous event, such as a suggested location of travel to apprehend the intruder, etc. In other words, the digital twin may be used in combination with real-time sensor data and an AR/VR wearable device, which may be worn by a first responder entering the school in response to the security threat/intruder, to efficiently navigate through the school being able to see on the AR/VR device where students and staff are located, to see where the intruder may be located, and to be visually directed through the school to safely and most efficiently locate the intruder such that the threat can be most efficiently addressed.

In some embodiments, the digital twin may be provided to people associated with a building to educate those people as to the locations and capabilities of various sensors provided in the building. For instance, parents may desire a copy of a digital twin of a school in order to understand the protections being provided at a school.

While various examples provided herein describe application of the system to various aspects of schools, the systems and methods described herein may also be used for performing other security analyses and measures, such as for vehicles, businesses, municipal locations, and/or other locations and/or items.

In the example embodiment, an example computing system may be configured to receive data from a plurality of sensors located near or within a building, apply the data from the plurality of sensors to a trained security assessment model to generate at least one model output, the trained security assessment model configured to compare the data from the plurality of sensors to a plurality of danger profiles, and/or determine an anomalous event is occurring and a security response to the anomalous event based on the at least one model output, the security response including a plurality of tasks.

The example computing system may also be configured to trigger a first task of the plurality of tasks and/or, in response to determining a predetermined period of time has elapsed, trigger a second task of the plurality of tasks.

In some embodiments, the first task of the plurality of tasks includes sending a first alert to at least one computing device associated with at least one of a primary investigator or a secondary investigator.

In some embodiments, the second task of the plurality of tasks includes sending a second alert to at least one computing device associated with at least one of the primary investigator or the secondary investigator. In some embodiments, in response to receiving an indication from the at least one computing device confirming the anomalous event, the example computing system may send an alert to an emergency services computing device.

In some embodiments, the example computing system may be configured to retrieve historical records from a database, the historical records including at least one of historical sensor data, historical security response data, or historical threat confirmation data, build a training dataset including the historical records or a subset of the historical records, and/or train a security assessment model using the training dataset to generate the trained security assessment model.

In some embodiments, the example computing system may be configured to add the anomalous event and associated data to the training dataset, thereby generating an updated training dataset and/or re-train the trained security assessment model using the updated training dataset.

In some embodiments, at least one sensor of the plurality of sensors includes an electronic nose (E-Nose) sensor wherein the E-Nose sensor is configured to: detect an emission including a composition, compare the composition to a stored composition profile associated with at least one of a weapon or an explosive, determine that at least one of the weapon or the explosive are detected based on the comparison of the composition to the stored composition profile, and/or cause detection data to be included in the data transmitted to the at least one processor, wherein the detection data is associated with the at least one of the weapon or the explosive being detected.

In some embodiments, a digital twin model of the building is generated by the trained security assessment model. In some embodiments, the digital twin model provides information regarding one or more of a location of the anomalous event or directions to the location. In some embodiments, the digital twin model is configured to be displayed on at least one of VR or AR glasses.

For instance, in examples where the building is a school, a predictive sensor (e.g., an E-Nose sensor) may be provided at the threshold of entrance doors throughout the school which when triggered will implement a customized process to confirm, mitigate, and/or avoid tragic outcomes to students and staff. This predictive sensor may be the nose and/or ears to detect the initial threat of a deadly weapon when it enters the school. This predictive sensor and a customized process (e.g., customized by a model and/or parties associated with the school) will allow the school and community support agencies to be able to act quickly and quietly before the attack can be implemented, and allow the potential threat can be subdued.

As one customized example, an E-Nose sensor may detect targeted elements (e.g., emissions) such as lead, copper, and/or zinc. The E-Nose sensor may be triggered and send a location via an app to a designated school contact (e.g., a principal). The principal may then send a private message or alert to all staff of potential risk. Teachers may engage locks on classroom doors and/or other customized actions decided from their customized protocols. The school notification system may prevent bells from ringing (e.g., change classroom bells) to prevent students from passing in the hallways and putting them at risk. Contact may be made with first responders to confirm the risk. Dogs may be brought in to confirm the E-Nose sensor trigger (e.g., a weapon) is on site. Confirmation of the weapon on the school property may be provided and second level preventative actions may be instituted in classrooms automatically and/or by teachers (e.g., turn off lights, block doors, if window is in the door, covering the window with a drape, and/or positioning children in previously designated areas of safety within the classroom.

As another example, an E-Nose sensor may be activated based on detection of the element(s) and/or designated smells, such as zinc and copper (e.g., and/or other customizable detections in an emission). A customizable alert may be sent to multiple designated personnel (e.g., the principal, office staff, custodians, security, lead teachers) who may be notified by customizable sounds and/or written alerts of a potential trigger being detected.

Selection of a toggle at a user device associated with designated personnel may be required to contact designated emergency responders. Note of receipt of selection of the toggle may be sent to all other contacts (e.g., others associated with the school that are not identified as the designated personnel above) so that they know the emergency responders will be arriving. For example, teachers may be notified that a trigger has been activated and secondary confirmation teams (e.g., dogs) may be arriving. As further examples, bells may be paused and all doors may be closed and locked. Notably, while some actions described herein may be performed manually (e.g., disabling of bells, closing of doors), it should be appreciated that all actions described herein may be automatically controlled by the example computing system described herein.

In some embodiments, if the designated contacts do not respond to an initial notification, 9-1-1 may be contacted to proceed with a secondary confirmation of the detected smells. This may be done in a "quiet" method so that students and staff are not worried.

Emergency responders may arrive onsite to confirm the initial trigger. A geo-locator may help direct the emergency responders to the trigger sensor (e.g., E-Nose that detected the potential threat) location. Secondary confirmation (e.g., from dogs) may be provided to validate the triggered sensor and/or advanced classroom protection protocols may be activated.

If confirmation does not happen, the sensor system may be reset. Data may be reviewed to determine if there can be improvements to the system (e.g., avoidance of further false positives) and confirm, if possible, what might have triggered the sensor. Example sensors and/or attributes tracked by sensors described herein may include WiFi sensors (e.g., for mapping), body heat (e.g., thermal) sensors, motion sensors (e.g., to detect unusual behaviors such as lurking), health sensors (e.g., to detect increased health rate, fever, etc.), door sensors, light sensors, sound sensors, phone sensors, wiring sensors, and/or school layout sensors.

In some embodiments, demonstrations of the system may be provided (e.g., without the sensing of a threat) in order to demonstrate the capabilities of the system and demonstrate how the sensors can be predictive.

While embodiments where the example building is a school are provided herein, it should be appreciated that the embodiments described herein may be applied to any building and/or plurality of buildings.

At least one of the technical problems addressed by this system may include: (i) time-consuming, labor-intensive, and costly determination of whether an anomalous event is and/or may be occurring, resulting in inefficient efforts to mitigate anomalous events and/or events that are potentially anomalous; (ii) potential anomalous events not being identified; (iii) false positive determinations that an anomalous event will occur and/or is occurring; (iv) limited data tracked and/or received with respect to determining that an anomalous event will occur and/or is occurring; and/or (v) limited data being provided to parties associated with systems configured to detect that an anomalous event will occur and/or is occurring.

The technical benefits and/or effects achieved by this system may be at least one of: (i) removal of the time-consuming, labor-intensive, and costly determination of whether an anomalous event is and/or may be occurring, resulting in efficient efforts to mitigate anomalous events and/or events that are potentially anomalous; (ii) identifying potential anomalous events before anomalous events occur; (iii) avoiding false positive determinations that an anomalous event will occur and/or is occurring; (iv) substantial amounts of data tracked and/or received with respect to determining that an anomalous event will occur and/or is occurring; and/or (v) comprehensive data being provided to parties associated with systems configured to detect that an anomalous event will occur and/or is occurring (e.g., a digital twin).

A technical effect of the systems and processes described herein may be achieved by performing at least one of the following steps: (i) receiving data from a plurality of sensors located near or within the building; (ii) applying the data from the plurality of sensors to a trained security assessment model to generate at least one model output, the trained security assessment model configured to compare the data from the plurality of sensors to a plurality of danger profiles; (iii) determining an anomalous event is occurring and a security response to the anomalous event based on the at least one model output, the security response comprising a plurality of tasks; (iv) triggering a first task of the plurality of tasks; and/or (v) in response to determining a predetermined period of time has elapsed, triggering a second task of the plurality of tasks.

Exemplary System for Maintaining Building Security

FIG. 1 illustrates an exemplary security system 100 for detecting anomalous events and generating responses to detected anomalous events in accordance with the present disclosure. Security system 100 may be implemented in a building 110, such as a school. System 100 illustrates a controller 115, a main security hub 125, an internal network 130, an external network 140, and other devices to receive data, analyze data, and trigger a security alert for the data collected and associated with a building environment.

In the exemplary embodiment, security system 100 includes controller 115, a toggle activator 120, main security hub 125, internal network 130, a first personal device 135A, and a second personal device 135B. Controller 115 is communicatively coupled, in the examples disclosed herein, to external network 140, which may communicate with first responder devices 150, as well as a first external device 145A, a second external device 145B, and/or a third external device 145C. Additionally, an intruder 105 is depicted, as well as a plurality of sensors 155 including an electronic nose (E-Nose) sensor 160.

In the exemplary embodiment, first personal device 135A and second personal device 135B may be mobile devices, laptops, and/or mobile phones, one or more voice or chat bots, a computer device, including, but not limited to, a desktop computer and/or a router, etc. In some embodiments, controller 115 is in wired or wireless communication to main security hub 125 in building 110. In some embodiments, controller 115 is a router or Wi-Fi providing device in building 110. In other embodiments, controller 115 is a smart controller that receives sensor data from main security hub 125 and provides communication to first personal device 135A, second personal device 135B, first external device 145A, second external device 145B, third external device 145C, and/or first responder devices 150 via internal network 130 or the external network 140.

In some embodiments, main security hub 125 includes a plurality of sensors 155. Plurality of sensors 155 may include, but are not limited to, one or more of heat sensors, WiFi sensors, motion sensors, video sensors, air sensors, etc., that provide real-time data about the current environmental conditions of building 110. Plurality of sensors 155 may be located at various locations of building 110.

In some embodiments, plurality of sensors 155 may include at least one E-Nose sensor 160. E-Nose sensor 160 may include a multi-sensor array that is monitored by pattern-recognition algorithms. More particularly, E-Nose sensor 160 may include a cross-reactive sensor array composed of different sensors selectively chosen to respond to a wide range of chemical classes and discriminate diverse mixtures of possible analytes. The output from each of the sensors may be collectively assembled and integrated to produce a distinct digital response pattern. Identification and classification of an analyte mixture by E-Nose sensor 160 may be accomplished through recognition of the distinct digital response pattern (e.g., electronic fingerprint) of the array of sensors. The distinct digital response pattern may be compared to a reference library of distinct digital response patterns for known samples to determine the types of chemical compounds in the sample. This process may be optimized using utilize artificial intelligence and/or machine learning techniques, such as artificial neural networks (ANNs).

In embodiments in accordance with the present disclosure, E-Nose sensor 160 may filter the air to detect whether lead, copper, zinc or any other type of material included or used in weapons such as firearms are present in the air near or at the building. The sensor data from E-Nose sensor 160 may be applied to the AI model to determine whether an anomalous event is occurring or is imminent.

As described herein, E-Nose sensor 160 may include an electronic sensing device intended to detect odors or emissions. The expression "electronic sensing" refers to the capability of reproducing human senses using sensor arrays and pattern recognition systems. The stages of the recognition process are similar to human olfaction and are performed for identification, comparison, quantification, and/or other applications.

E-Nose sensor 160 may include head space sampling, a chemical sensor array, and/or pattern recognition modules, to generate signal patterns that are used for characterizing odors. These sensors may include three major parts: a sample delivery system, a detection system, and/or a computing system. The sample delivery system enables the generation of the headspace (volatile compounds) of a sample, which may be the fraction analyzed. The system may then inject the headspace into the detection system of the electronic nose. The sample delivery system is used to facilitate constant operating conditions. The detection system, which may include a sensor set, is the "reactive" part of the instrument. When in contact with volatile compounds, the sensors react, which means they experience a change of electrical properties. In some sensors, each sensor is sensitive to all volatile molecules but each in their specific way. Some of these sensors use chemical sensor arrays that react to volatile compounds on contact: the adsorption of volatile compounds on the sensor surface causes a physical change of the sensor. A specific response is recorded by the electronic interface transforming the signal into a digital value. Recorded data are then computed based on models.

Some E-Nose sensors include: metal-oxide-semiconductor (MOS) devices—metal-oxide-semiconductor sensors contain a metal oxide coating with an electrical resistance that changes in the presence of a target gas. The presence of the target gas can be inferred by measuring the change in the resistance of the metal oxide layer over time; conducting polymers—organic polymers that conduct electricity; polymer composites—similar in use to conducting polymers but formulated of non-conducting polymers with the addition of conducting material such as carbon black; quartz crystal microbalance (QCM)—a way of measuring mass per unit area by measuring the change in frequency of a quartz crystal resonator; surface acoustic wave (SAW)—a class of microelectromechanical systems (MEMS) which rely on the modulation of surface acoustic waves to sense a physical phenomenon; and Mass spectrometers can be miniaturized to form general purpose gas analysis device. In some embodiments, the measurements may be stored in a database and/or used for future reference. In some cases, other types of electronic noses may be used that utilize mass spectrometry or ultra-fast gas chromatography as a detection system.

Using the data provided by plurality of sensors 155, controller 115, in examples disclosed herein, may determine (e.g., using an AI model) whether the data matches at least one of a plurality of danger profiles indicating that an anomalous (security related) event is occurring or about to occur. Upon making the determination that an anomalous event is about to occur, controller 115 triggers, in examples disclosed herein, toggle activator 120, which sends a series of alerts, as part of a determined sequence of events, through the internal network 130 and the external network 140. In some embodiments, the series of alerts (e.g., types of alerts and/or timings of alerts) is customizable on a by-building basis (e.g., by an entity associated with a building being monitored).

In certain embodiments described herein, as part of a determined sequence of tasks, toggle activator 120 may send a first alert through internal network 130 to first personal device 135A, then to second personal device 135B after a threshold amount of time has passed (e.g., 5 minutes). This multi-stage security response ensures that the first designated individual carrying and/or otherwise managing first personal device 135A has time to investigate the situation and/or provide an update via their first personal device 135A back to the controller 115 on whether the situation is indeed dangerous. In situations wherein the first designated individual carrying the first personal device 135A is unable to respond to the alert within that threshold amount of time, toggle activator 120 would then send a second alert to the second personal device 135B, which is carried and/or otherwise managed by a second designated individual. Additionally, in some embodiments, these first and second designated individuals have the option to mark the situation as "safe" to disable the alert for situations in which a false alarm is triggered. In examples disclosed herein, the sequence of tasks as part of the determined security response will vary based on the analysis performed by the AI model and/or the severity of the anomalous event.

In some embodiments disclosed herein, the controller 115 may also send a series of alerts through the external network 140 to alert the first responder devices 150 and/or a plurality of external devices such as first external device 145A, second external device 145B, and/or third external device 145C, which may, for example, be carried and/or otherwise be managed by parents.

In some embodiments, an AI model may be configured to make a determination in conjunction with controller 115 and based on the sensor data received from main security hub 125 on whether an anomalous event is about to occur at building 110. In at least some instances, third party data relating to other schools and/or buildings within a geographic vicinity of building 110 may also be provided to the AI model to advise this determination. In the exemplary embodiment, the AI model may output its determination in a data interchange format such as JavaScript Object Notation (JSON), which may be interpreted by other components of system 100 such as first personal device 135A and/or second personal device 135B to display the alert. For example, in embodiments in which the alert is displayed via a mobile application, the mobile application may be configured to generate a user interface (e.g., including text, lists, shapes, colors, sounds, etc.) for presenting the recommendations based on recommendation data output by the AI model.

Exemplary Security System

Figure 2:
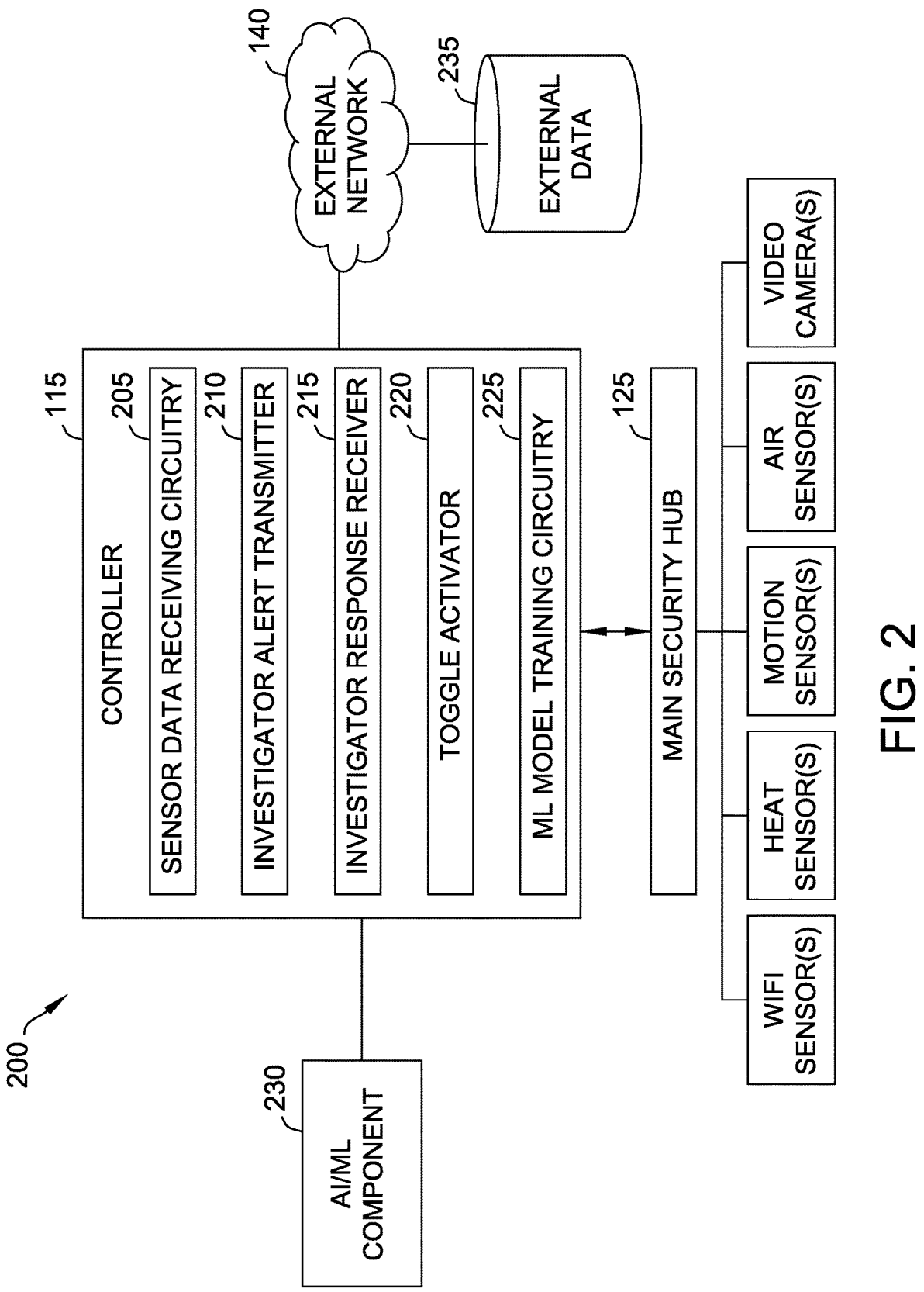
FIG. 2 illustrates a block diagram of the exemplary security system of FIG. 1, in accordance with an embodiment of the present disclosure.

FIG. 2 illustrates a block diagram 200 of exemplary security system 100 that may be used for maintaining security of building 110 of FIG. 1, in accordance with the teachings of the present disclosure. In some embodiments, controller 115 further includes sensor data receiving circuitry 205, an investigator alert transmitter 210, an investigator response receiver 215, a toggle activator 220 (e.g., toggle activator 120), and a ML model training circuitry 225.

In examples disclosed herein, sensor data receiving circuitry 205 may be configured to receive a plurality of sensor data from main security hub 125, main security hub 125 including an array of sensors (e.g., plurality of sensors 155) of a plurality of different types, such as WiFi sensors, heat sensors, motion sensors, air sensors, video cameras, E-Nose sensors, etc. Sensor data receiving circuitry 205, upon receiving the plurality of sensor data, then transmits the sensor data to an ML model 230 (e.g., an AI and/or ML model) for analysis.

In some embodiments, the received plurality of sensor data is compared to a set of danger profiles to determine whether an anomalous event is imminent or occurring. In some embodiments, the received plurality of sensor data is applied to a trained security assessment model to generate one or more model outputs. The one or more model outputs may be used in determining whether an anomalous event is occurring or imminent and a security response to the anomalous event. The trained security assessment model may compare the received data against various danger profiles. More particularly, the security assessment model may compare the ranges of sensor data for each type of sensor against a set of danger thresholds included within the danger profiles. In certain examples disclosed herein, these danger profiles may be provided via an external database such as external data sources 235 via external network 140.

In some embodiments, once it is determined that an anomalous event is about to occur or is occurring, investigator alert transmitter 210 sends an alert to at least a first and/or second designated individual via a computing device, such as first personal device 135A and/or second personal device 135B. In some embodiments, first and/or second personal devices 135A, 135B may be a personal cell phone, a laptop, a transmitter, etc. In examples disclosed herein, once the alert is transmitted, the primary and/or secondary investigators have a threshold amount of time to respond to the alert in order to confirm the suggested danger or clear the threat by marking the situation as safe. In embodiments described herein, such a response can be transmitted via first and/or second personal devices 135A, 135B and is received by investigator response receiver 215. In examples disclosed herein, toggle activator 120, upon receiving confirmation of the threat by the primary and/or secondary investigator, initiates a sequence of emergency responses. For instance, in some embodiments, toggle activator 120 may place a call to emergency services, alert parents of the children in the school, lock the doors, turn off the lights, etc.

In some embodiments, ML model training circuitry 225 may dynamically update the security assessment model with updated danger profiles based on sensor data received and events that occur within the building (e.g., school). For example, in the event of a false alarm (e.g., wherein an alert is triggered but the situation is cleared by the primary and/or secondary investigator), the security assessment model would need to be re-trained to recognize the ranges of sensor data that were flagged as dangerous as being safe.

Exemplary Computer-Implemented Method for Generating Recommendations

FIGS. 3-5 depict flow charts of exemplary computer-implemented methods 300, 400, and 500, respectively, for generating AI-based security alerts for building 110 (shown in FIG. 1) using system 100 (shown in FIG. 1).

More particularly, FIG. 3 depicts an exemplary computer-implemented method 300 for detecting an anomalous event and initiating a security response. Method 300 includes receiving 302 a plurality of data from at least one sensor. In some embodiments, the plurality of data may be collected and transmitted by main security hub 125 (shown in FIGS. 1 and 2), and may be related to the environmental conditions of the building. In some embodiments, receiving 302 a plurality of data from at least one sensor may be performed by the sensor data receiving circuitry 205 (shown in FIG. 2).

Method 300 further includes applying 304 at least some of the received data to a trained security assessment model at to generate one or more model outputs. In some embodiments, additional data, such as the presence of an unauthorized person in the building, may be applied to the trained security assessment model. In some embodiments, the security assessment model compares the data from the plurality of sensors to a plurality of danger profiles. Method 300 also includes determining 306 an anomalous event is imminent or occurring based on the model output. Additionally or alternatively, determining 306 that an anomalous event is imminent or occurring may be based on a status of toggle activator 120 (shown in FIGS. 1 and 2). The trained security assessment model may further determine a security response which may include a sequence of tasks for securing the building. The tasks may include, but are not limited to, sending alerts, shutting the doors, turning off the lights, sending a series of alerts, etc., and may be based on the nature of the anomalous event that has been detected.

The determined security response in the embodiment illustrated in FIG. 3 includes sending 308 an alert to one or more computing devices associated with a designated primary investigator (e.g., or primary investigators). The alert may include information regarding the anomalous event. In some embodiments, sending 308 the alert may be performed by investigator alert transmitter 210 (shown in FIG. 2).

Method 300 may include receiving 310 an all-clear notification from the one or more computing devices associated with the primary investigator, thereby signaling no threat or danger. Receiving 310 the all-clear notification may be performed by investigator response receiver 215 (shown in FIG. 2). The one or more computing devices associated with the primary investigator may include first personal device 135A or second personal device 135B (shown in FIG. 1).

FIG. 4 depicts an exemplary computer-implemented method 400 for detecting an anomalous event and initiating a security response. Method 400 includes receiving 402 a plurality of data from at least one sensor. In some embodiments, the plurality of data may be collected and transmitted by main security hub 125 (shown in FIGS. 1 and 2), and may be related to the environmental conditions of the building. In some embodiments, receiving 402 a plurality of data from at least one sensor may be performed by the sensor data receiving circuitry 205 (shown in FIG. 2).

Method 400 further includes applying 404 at least some of the received data to a trained security assessment model to generate one or more model outputs. In some embodiments, additional data, such as the presence of an unauthorized person in the building, may be applied to the trained security assessment model. In some embodiments, the security assessment model compares the data from the plurality of sensors to a plurality of danger profiles. Method 400 also includes determining 406 an anomalous event is imminent or occurring based on the model output. Additionally, or alternatively, determining 406 that an anomalous event is imminent or occurring is based on a status of toggle activator 120 (shown in FIGS. 1 and 2). The trained security assessment model may further determine a security response which may include a sequence of tasks for securing the building. The tasks may include, but are not limited to, sending alerts, the doors, turning off the lights, sending a series of alerts, etc., and may be based on the nature of the anomalous event that has been detected.

The determined security response in the embodiment illustrated in FIG. 4 includes sending 408 an alert to one or more computing devices associated with a designated primary investigator. The alert may include information regarding the anomalous event. In some embodiments, sending 308 the alert may be performed by the investigator alert transmitter 210 (shown in FIG. 2).

The determined security response in the embodiment illustrated in FIG. 4 includes sending 408 an alert to one or more computing devices (e.g., first and/or second personal devices 135A, 135B shown in FIG. 1) associated with a designated primary investigator. The alert may include information regarding the anomalous event. In some embodiments, sending 408 the alert may be performed by investigator alert transmitter 210 (shown in FIG. 2).

Method 400 may include receiving 410 confirmation of the threat from one or more computing devices associated with the primary investigator. In some embodiments, receiving 410 threat confirmation from the primary investigator may involve receiving a message or other indication from one or more computing devices (e.g., first or second personal devices 135A, 135B shown in FIG. 1), that the threat is legitimate. Receiving 410 may be performed by investigator response receiver 215 (shown in FIG. 2).

Method 400 may include alerting 412 emergency services and/or a plurality of other external devices (e.g., computing devices 145A-C shown in FIG. 1) of the threat. In the exemplary embodiment, alerting 412 emergency services and/or a plurality of other external devices of the danger may be performed via external network 140 by toggle activator 120 (shown in FIGS. 1 and 2).

FIG. 5 depicts another exemplary computer-implemented method 500 for generating a security response. Method 500 includes receiving 502 a plurality of data from at least one sensor. In some embodiments, the plurality of data may be collected and transmitted by main security hub 125 (shown in FIGS. 1 and 2), and may be related to the environmental conditions of the building. In some embodiments, receiving 502 a plurality of data from at least one sensor may be performed by the sensor data receiving circuitry 205 (shown in FIG. 2).

Method 500 further includes applying 504 at least some of the received data to a trained security assessment model at to generate one or more model outputs. In some embodiments, additional data, such as the presence of an unauthorized person in the building, may be applied to the trained security assessment model. In some embodiments, the security assessment model compares the data from the plurality of sensors to a plurality of danger profiles. Method 500 also includes determining 506 an anomalous event is imminent or occurring based on the model output. Additionally, or alternatively, determining 506 that an anomalous event is imminent or occurring is based on a status of toggle activator 120 (shown in FIGS. 1 and 2). The trained security assessment model may further determine a security response which may include a sequence of tasks for securing the building. The tasks may include, but are not limited to, sending alerts, the doors, turning off the lights, sending a series of alerts, etc., and may be based on the nature of the anomalous event that has been detected.

The determined security response in the embodiment illustrated in FIG. 5 includes sending 508 an alert to one or more computing devices associated with a designated primary investigator. The alert may include information regarding the anomalous event. In some embodiments, sending 508 the alert may be performed by investigator alert transmitter 210 (shown in FIG. 2).

Method 500 may include determining 510 that there has been no feedback from the designated primary investigator within a predetermined period of time. In some embodiments, determining 510 no feedback from the designated primary investigator for a predetermined period of time may be performed by the investigator response receiver 215 (shown in FIG. 2).

In response to determining no contact from the primary investigator, method 500 may include sending 512 an alert to one or more computing devices associated with the designated secondary investigator (e.g., or secondary investigators) of the anomalous event. In some embodiments sending 512 an alert to the designated secondary investigator of the anomalous event may be performed by investigator alert transmitter 210 (shown in FIG. 2).

Method 500 may further include receiving 514 confirmation of the threat from one or more computing devices associated with the secondary investigator. In some embodiments, receiving 514 threat confirmation from the secondary investigator may involve receiving a message or other indication from one or more computing devices (e.g., first or second personal devices 135A, 135B shown in FIG. 1), that the threat is legitimate. Receiving 514 may be performed by the investigator response receiver 215 (shown in FIG. 2).

Method 500 may include sending 516 an alert to emergency services and/or a plurality of other external devices (e.g., computing devices 145A-C shown in FIG. 1) of the danger. In some embodiments, sending 516 and alert to emergency services and/or a plurality of other external devices of the danger may be performed via external network 140 by toggle activator 120 (shown in FIGS. 1 and 2).

The foregoing methods (e.g., methods 400, 500, and 600) may also include one or more actions for generating, e.g., training and/or tuning, the security assessment model. FIG. 6 depicts an example method 600 for training and re-training the security assessment model. Method 600 includes retrieving 602 historical records from a historical database (e.g., external data sources 235 shown in FIG. 2) and building a training dataset including the historical records or a subset of the historical records. For example, the training dataset may include historical sensor data, historical security response data, and/or historical threat confirmation data (e.g., historical confirmation or disconfirmation of an anomalous event).

Method 600 may further include training 604 the security assessment model using the training dataset. In some embodiments, security assessment model may include a plurality of model parameters. Method 600 may further include tuning the trained security assessment model by iteratively evaluating the security assessment model while adjusting weighting factors of the model parameters until the error in the model outputs meets an error criterion.

Method 600 may further include receiving 606 one or more new event records including sensor data, security response data, and/or threat confirmation data (e.g., confirmation or disconfirmation of anomalous event) associated with a security event. Method 600 may include adding 608 the one or more new event records to the training dataset to generate an updated training dataset. Method 600 may further include re-training 610 the security assessment model using the updated training dataset in order to generate a more accurate and/or a more up-to-date version of the security assessment model. In this way, security assessment model may learn over time circumstances which result in a false positive or a false negative, which circumstances constitute a true threat, and which circumstances are grounds for sending an alert. In some embodiments, generating, e.g., training and/or tuning, the security assessment model may be performed by the ML model training circuitry 225 (shown in FIG. 2).

Exemplary External Data Sources

In the exemplary embodiment, as shown in diagram 200, various types of external data may be collected from external data sources 235 that may be used, for example, to train ML model 230, build danger profiles, and/or other various uses described herein. Some external data sources 235 may provide publicly available data, where other external data sources 235 may be private, third-party sources. External data sources 235 may include data from police scanners, data from buildings in the vicinity, etc. to better inform ML model 230 of imminent danger.

18

Exemplary Computing Device

Figure 7:
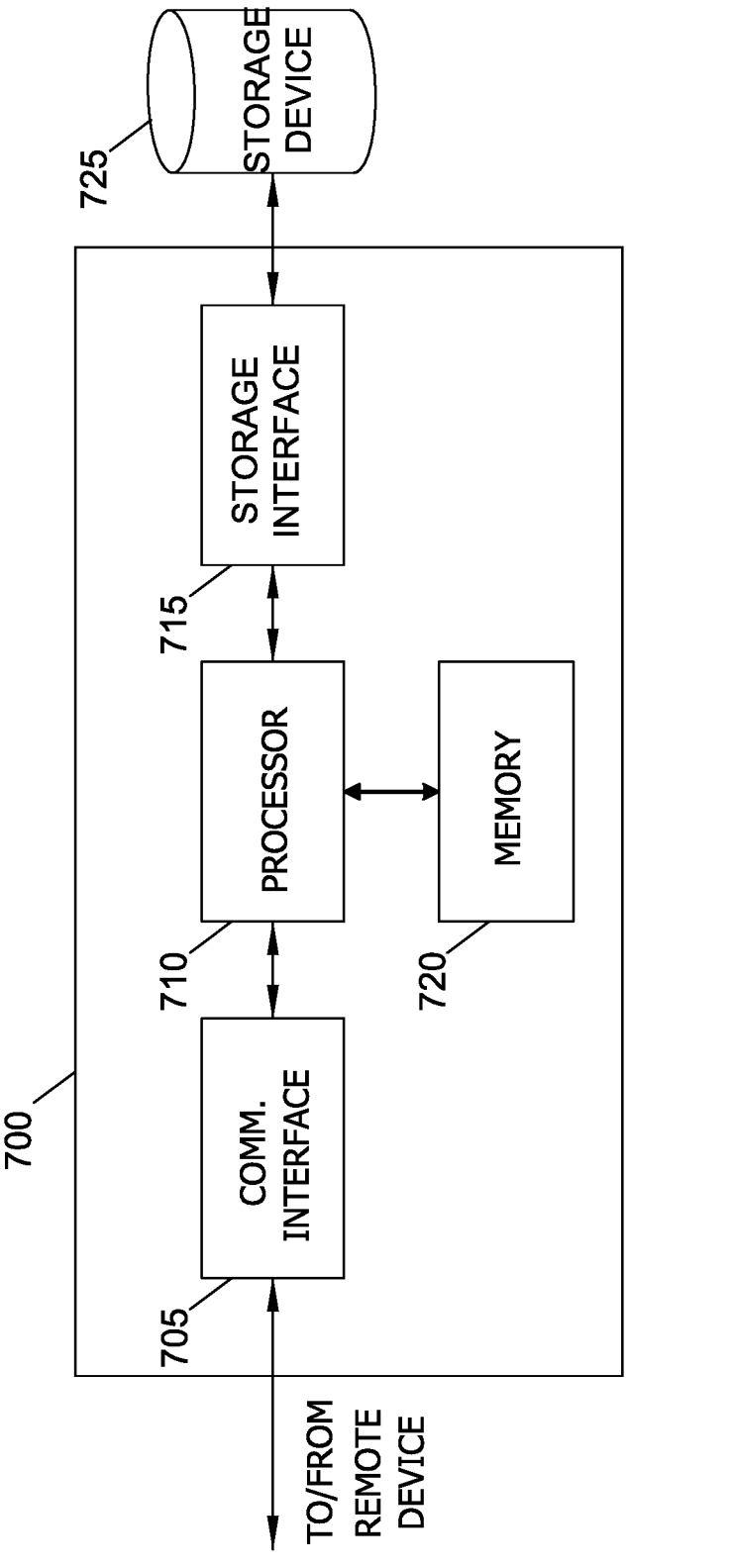
FIG. 7 illustrates a block diagram of an exemplary personal computing device, in accordance with an embodiment of the present disclosure.

FIG. 7 depicts an exemplary configuration of a personal computing device 700, shown in FIG. 1 as first and second personal devices 135A, 135B, first, second, and third external devices 145A-C, and/or a server computing device, in accordance with one embodiment of the present disclosure. Personal computing device 700 may include a processor 710 for executing instructions. Instructions may be stored in a memory area 720. Processor 710 may include one or more processing units (e.g., in a multi-core configuration).

Processor 710 may be operatively coupled to a communication interface 705 such that personal computing device 700 is capable of communicating with a remote device such as another server computer device or another personal computing device. For example, communication interface 705 may transmit security alerts and/or receive danger confirmation or all-clear alerts.

Processor 710 may also be operatively coupled to a storage device 725. Storage device 725 may be any computer-operated hardware suitable for storing and/or retrieving data, such as, but not limited to, data associated with external data sources 235 (shown in FIG. 2). In some embodiments, storage device 725 may be integrated in personal computing device 700. For example, the personal computing device 700 may include one or more hard disk drives as storage device 725.

In some embodiments, storage device 725 may be external to device 700 and may be accessed by a plurality of personal computing devices 700. For example, storage device 725 may include a storage area network (SAN), a network attached storage (NAS) system, and/or multiple storage units such as hard disks and/or solid state disks in a redundant array of inexpensive disks (RAID) configuration.

In some embodiments, processor 710 may be operatively coupled to storage device 725 via a storage interface 715. Storage interface 715 may be any component capable of providing processor 710 with access to storage device 725. Storage interface 715 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 710 with access to storage device 725.

Processor 710 may execute computer-executable instructions for implementing aspects of the disclosure. In some embodiments, processor 710 may be transformed into a special purpose microprocessor by executing computer-executable instructions or by otherwise being programmed. For example, processor 710 may be programmed with the instructions such as those illustrated in FIGS. 3-6.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, system 100 is configured to implement machine learning, such that system 100 "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of building attributes with known characteristics or features. Such information may include, for example, information associated with a plurality of IoT devices.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In some embodiments, generative artificial intelligence (AI) models (also referred to as generative machine learning (ML) models) may be utilized with the present embodiments, and may the voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Based upon these analyses, the processing element may learn how to identify characteristics and patterns that may then be applied to analyzing and classifying objects. The processing element may also learn how to identify attributes of different objects in different lighting. This information may be used to determine which classification models to use and which classifications to provide.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program may be embodied on a computer-readable medium. In an example, the system may be executed on a single computer system, without requiring a connection to a server computer. In a further example, the system may be being run in a Windows® environment (Windows is a registered trademark of Microsoft Corporation, Redmond, Washington). In yet another example, the system may be run on a mainframe environment and a UNIX® server environment (UNIX is a registered trademark of X/Open Company Limited located in Reading, Berkshire, United Kingdom). In a further example, the system may be run on an iOS® environment (iOS is a registered trademark of Cisco Systems, Inc. located in San Jose, CA). In yet a further example, the system may be run on a Mac OS® environment (Mac OS is a registered trademark of Apple Inc. located in Cupertino, CA). In still yet a further example, the system may be run on Android® OS (Android is a registered trademark of Google, Inc. of Mountain View, CA). In another example, the system may be run on Linux® OS (Linux is a registered trademark of Linus Torvalds of Boston, MA). The application may be flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Further, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Further, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing system for electronically maintaining security of a building using a plurality of sensors located near or within the building, the computing system comprising:

at least one processor; and at least one memory device, the at least one processor configured to:

receive data from the plurality of sensors;

apply the data from the plurality of sensors to a trained security assessment model to generate at least one model output, the trained security assessment model configured to compare the data from the plurality of sensors to a plurality of danger profiles;

determine an anomalous event is occurring and a security response to the anomalous event based on the at least one model output, the security response comprising a plurality of tasks;

trigger a first task of the plurality of tasks, the first task comprising sending a first alert prompting input from a first computing device associated with the building; and determine a next task of the plurality of tasks to perform from a second task and a third task, i) the second task comprising sending a second alert prompting input from a second computing device associated with the building based upon a predetermined period of time elapsing with no input received from the first computing device, ii) the third task comprising sending a third alert to the second computing device, the third alert indicating that the anomalous event is occurring based upon receiving an input from the first computing device confirming that the anomalous event is occurring.

2. The computing system of claim 1, wherein the first task of the plurality of tasks comprises sending the first alert to the first computing device, the first computing device associated with a first predefined individual associated with the building.

3. The computing system of claim 2, wherein the second task of the plurality of tasks comprises sending the second alert to the second computing device, the second computing device associated with a second predefined individual associated with the building.

4. The computing system of claim 2, wherein the at least one processor is further configured to, in response to receiving the input confirming that the anomalous event is occurring, trigger a fourth task of the plurality of tasks, the fourth task comprising sending a fourth alert to an emergency services computing device.

5. The computing system of claim 1, wherein the at least one processor is further configured to:

retrieve historical records from a database, the historical records comprising at least one of historical sensor data, historical security response data, or historical threat confirmation data;

build a training dataset including the historical records or a subset of the historical records; and train a security assessment model using the training dataset to generate the trained security assessment model.

6. The computing system of claim 5, wherein the at least one processor is further configured to:

add the anomalous event and associated data to the training dataset, thereby generating an updated training dataset; and re-train the trained security assessment model using the updated training dataset.

7. The computing system of claim 1, wherein at least one sensor of the plurality of sensors comprises an electronic nose (E-Nose) sensor, and wherein the E-Nose sensor is configured to:

detect an emission including a composition;

compare the composition to a stored composition profile associated with at least one of a weapon or an explosive;

determine that at least one of the weapon or the explosive are detected based on the comparison of the composition to the stored composition profile; and cause detection data to be included in the data transmitted to the at least one processor, wherein the detection data is associated with the at least one of the weapon or the explosive being detected.

8. The computing system of claim 1, wherein a digital twin model of the building is generated by the trained security assessment model.

9. The computing system of claim 8, wherein the digital twin model provides information regarding one or more of a location of the anomalous event or directions to the location.

10. The computing system of claim 9, wherein the digital twin model is configured to be displayed on at least one of VR or AR glasses.

11. A computer-implemented method for electronically maintaining security of a building using a plurality of sensors located near or within the building, the computer-implemented method implemented by at least one processor in communication with at least one memory, the computer-implemented method comprising:

receiving data from the plurality of sensors;

applying the data from the plurality of sensors to a trained security assessment model to generate at least one model output, the trained security assessment model configured to compare the data from the plurality of sensors to a plurality of danger profiles;

determining an anomalous event is occurring and a security response to the anomalous event based on the at least one model output, the security response comprising a plurality of tasks;

triggering a first task of the plurality of tasks, the first task comprising sending a first alert prompting input from a first computing device associated with the building; and determining a next task of the plurality of tasks to perform from a second task and a third task, i) the second task comprising sending a second alert prompting input from a second computing device associated with the building based upon a predetermined period of time elapsing with no input received from the first computing device, ii) the third task comprising sending a third alert to the second computing device, the third alert indicating that the anomalous event is occurring based upon receiving an input from the first computing device confirming that the anomalous event is occurring.

12. The computer-implemented method of claim 11, wherein the first task of the plurality of tasks comprises sending the first alert to the first computing device, the first computing device associated with a first predefined individual associated with the building.

13. The computer-implemented method of claim 12, wherein the second task of the plurality of tasks comprises sending the second alert to the second computing device, the second computing device associated with a second predefined individual associated with the building.

14. The computer-implemented method of claim 12, further comprising, in response to receiving the input confirming that the anomalous event is occurring, triggering a fourth task of the plurality of tasks, the fourth task comprising sending an alert to a fourth emergency services computing device.

15. The computer-implemented method of claim 11 further comprising:

retrieving historical records from a database, the historical records comprising at least one of historical sensor data, historical security response data, or historical threat confirmation data;

building a training dataset including the historical records or a subset of the historical records; and training a security assessment model using the training dataset to generate the trained security assessment model.

16. The computer-implemented method of claim 15, further comprising:

adding the anomalous event and associated data to the training dataset, thereby generating an updated training dataset; and re-training the trained security assessment model using the updated training dataset.

17. The computer-implemented method of claim 11, wherein at least one sensor of the plurality of sensors comprises an electronic nose (E-Nose) sensor, and wherein the E-Nose sensor is configured to:

detect an emission including a composition;

compare the composition to a stored composition profile associated with at least one of a weapon or an explosive;

determine that at least one of the weapon or the explosive are detected based on the comparison of the composition to the stored composition profile; and cause detection data to be included in the data transmitted to the at least one processor, wherein the detection data is associated with the at least one of the weapon or the explosive being detected.

18. The computer-implemented method of claim 11, wherein a digital twin model of the building is generated by the trained security assessment model.

19. The computer-implemented method of claim 18, wherein the digital twin model provides information regarding one or more of a location of the anomalous event or directions to the location.

20. At least one non-transitory computer readable medium with instructions stored thereon for electronically maintaining security of a building using a plurality of sensors located near or within the building, wherein the instructions, in response to execution by at least one processor, cause the at least one processor to:

receive data from the plurality of sensors;

apply the data from the plurality of sensors to a trained security assessment model to generate at least one model output, the trained security assessment model configured to compare the data from the plurality of sensors to a plurality of danger profiles;

determine an anomalous event is occurring and a security response to the anomalous event based on the at least one model output, the security response comprising a plurality of tasks;

trigger a first task of the plurality of tasks, the first task comprising sending a first alert prompting input from a first computing device associated with the building; and determine a next task of the plurality of tasks to perform from a second task and a third task, ii) the second task comprising sending a second alert prompting input from a second computing device associated with the building based upon a predetermined period of time elapsing with no input received from the first computing device, ii) the third task comprising sending a third alert to the second computing device, the third alert indicating that the anomalous event is occurring based upon receiving an input from the first computing device confirming that the anomalous event is occurring.

* * * * *